(12) United States Patent
Ueki

(10) Patent No.: US 11,059,456 B2
(45) Date of Patent: Jul. 13, 2021

(54) IN-VEHICLE AUTHENTICATION DEVICE AND PORTABLE DEVICE AUTHENTICATION METHOD

(71) Applicant: DENSO CORPORATION, Kariya (JP)

(72) Inventor: Tatsuya Ueki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/700,186

(22) Filed: Dec. 2, 2019

(65) Prior Publication Data

US 2020/0101940 A1 Apr. 2, 2020

Related U.S. Application Data

(63) Continuation of application No. PCT/JP2018/012265, filed on Mar. 27, 2018.

(30) Foreign Application Priority Data

Jun. 13, 2017 (JP) .............................. JP2017-116338

(51) Int. Cl.
*B60R 25/24* (2013.01)
*G07C 9/00* (2020.01)
*H04W 12/06* (2021.01)
*H04W 12/61* (2021.01)

(52) U.S. Cl.
CPC ........ *B60R 25/246* (2013.01); *G07C 9/00309* (2013.01); *H04W 12/06* (2013.01); *H04W 12/61* (2021.01); *B60R 2325/10* (2013.01); *B60R 2325/205* (2013.01); *G07C 2009/00396* (2013.01)

(58) Field of Classification Search
CPC .............. B60R 25/246; B60R 2325/10; G07C 9/00309; G07C 2009/00396; H04W 12/06; H04B 1/3822
USPC ......................................................... 340/7.2
See application file for complete search history.

(56) References Cited

U.S. PATENT DOCUMENTS

2009/0267734 A1* 10/2009 Kwon ................. B60R 25/2036
340/5.72
2014/0051364 A1* 2/2014 Simons ................ H04B 1/3822
455/68

(Continued)

FOREIGN PATENT DOCUMENTS

JP 2012227586 A 11/2012
JP 2015003545 A 1/2015
JP 2016178617 A 10/2016

*Primary Examiner* — Vernal U Brown
(74) *Attorney, Agent, or Firm* — Harness, Dickey & Pierce, P.L.C.

(57) ABSTRACT

An in-vehicle authentication device may perform wireless communication with a portable device in a vicinity of a vehicle. The in-vehicle authentication device may transmit a call signal that requests a reply of a response signal to the portable device. The in-vehicle authentication device may transmit an authentication request signal that requests a reply of an authentication signal to the portable device when the in-vehicle authentication device determines that the portable device exists in the vicinity of the vehicle by receiving the response signal. The in-vehicle authentication device may authenticate the portable device that transmits the authentication signal based on the authentication signal when the authentication signal is received.

5 Claims, 12 Drawing Sheets

(56) References Cited

U.S. PATENT DOCUMENTS

2016/0125722 A1    5/2016  Ueki et al.
2016/0275732 A1    9/2016  Tomita et al.

\* cited by examiner

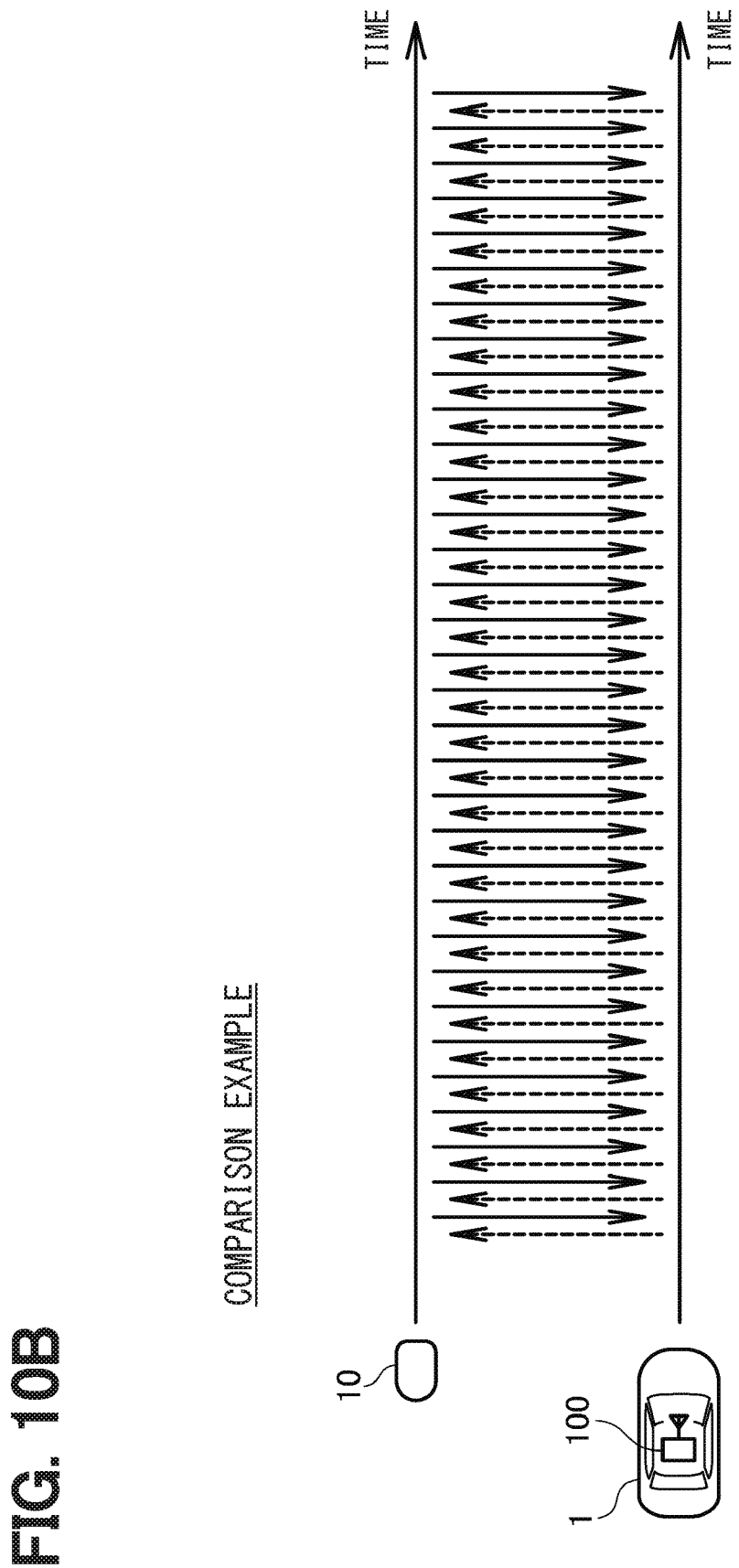

Н-VEHICLE AUTHENTICATION DEVICE
AND PORTABLE DEVICE
AUTHENTICATION METHOD

CROSS REFERENCE TO RELATED
APPLICATIONS

The present application is a continuation application of International Patent Application No. PCT/JP2018/012265 filed on Mar. 27, 2018, which designated the U.S. and claims the benefit of priority from Japanese Patent Application No. 2017-116338 filed on Jun. 13, 2017. The entire disclosures of all of the above applications are incorporated herein by reference.

TECHNICAL FIELD

The present disclosure relates to an in-vehicle authentication device and a portable device authentication method each of which authenticates a portable device existing in a vicinity of a vehicle by performing wireless communication with the portable device.

BACKGROUND

In order to solve a burdensome problem of taking out a key and unlocking a door each time a passenger gets into the vehicle, a technique called passive entry has been developed. With the passive entry, the vehicle detects the approach of the key and automatically unlocks the door. This technique is widely used.

SUMMARY

The present disclosure provides an in-vehicle authentication device. The in-vehicle authentication device may perform wireless communication with a portable device in a vicinity of a vehicle. The in-vehicle authentication device may transmit a call signal that requests a reply of a response signal to the portable device. The in-vehicle authentication device may transmit an authentication request signal that requests a reply of an authentication signal to the portable device when the in-vehicle authentication device determines that the portable device exists in the vicinity of the vehicle by receiving the response signal. The in-vehicle authentication device may authenticate the portable device that transmits the authentication signal based on the authentication signal when the authentication signal is received.

BRIEF DESCRIPTION OF DRAWINGS

The features and advantages of the present disclosure will become more apparent from the following detailed description made with reference to the accompanying drawings. In the drawings:

FIG. 10B is a diagram showing a situation in which the in-vehicle authentication device does not stop the transmission of the call signal.

DETAILED DESCRIPTION

Figure 1A:
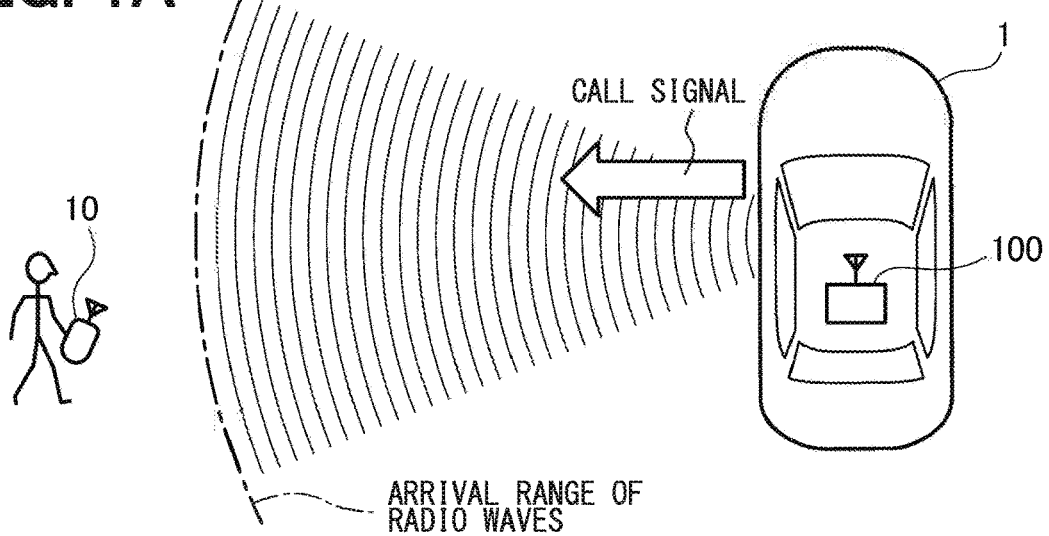
FIG. 1A is a diagram showing a situation in which the portable device does not exist within a reach of radio wave from an in-vehicle authentication device.

For example, in the passive entry, a wireless communication device (hereinafter referred to as an in-vehicle authentication device), which is mounted on the vehicle and has an authentication function, communicates with a small wireless communication device (hereinafter referred to as a portable device) carried by a person trying to get into the vehicle. The in-vehicle authentication device authenticates whether the portable device is a genuine portable device. When the authentication succeeds and the in-vehicle authentication device authenticates that the portable device is a genuine portable device, the door of the vehicle is unlocked or the unlock is prepared.

In order to realize the above-described configuration, the in-vehicle authentication device transmits a call signal (so-called a Wake signal) to the portable device existing in the surroundings at a certain cycle, and the portable device that has received the call signal from the in-vehicle authentication device transmits a response signal (so-called an Ack signal). When a portable device exists in the vicinity, the response signal from the portable device is returned. Therefore, the in-vehicle authentication device can determine the presence or absence of a portable device in the vicinity based on the presence or absence of the response signal. When the portable device exists in the vicinity, the in-vehicle authentication device transmits an authentication request signal (so-called a Challenge signal) that requests a response of the authentication signal. The portable device that has received the authentication request signal transmits the requested authentication signal (so-called a Response signal). The in-vehicle authentication device authenticates the portable device using the authentication signal. When the authentication succeeds, the in-vehicle authentication device outputs the fact to an in-vehicle device that controls the unlocking of the door.

When the authentication succeeds, a genuine portable device is present in the vicinity. Thereafter, it is not necessary to transmit the call signal at a constant cycle. On the other hand, when the authentication fails, the in-vehicle authentication device continues to transmit the call signal at a constant period in preparation for a case where a genuine portable device approaches.

Thus, in order for the in-vehicle authentication device to authenticate the portable device, the in-vehicle authentication device and the portable device need to communicate wirelessly. In particular, since the portable device is used by being carried, electric power is provided by a battery. Thus, there is a strong demand for reducing battery consumption.

A technique that pays attention to the fact that a portable device is carried when it is used has been proposed. A vibration sensor is built in the portable device. When no vibration is detected, it is determined that the portable device is not used. Thus, the response signal is not transmitted even when the call signal is received from the in-vehicle authentication device. In the proposed technique, when the portable device is not used, such as when the portable device is placed on a desk, a situation where the response signal is returned each time the call signal is received from the in-vehicle authentication device and the battery is consumed can be reduced.

Even when the proposed technique described above is employed, there are still cases where the battery of the portable device is abnormally consumed.

Normally, an authentication request signal has a larger data amount than a call signal. For this reason, it is found that, depending on the state of the portable device, the reception sensitivity may decrease during reception of the authentication request signal and the reception of the authentication request signal may not be completed so that the authentication signal cannot be returned. In this situation, the vehicle detects a state in which the authentication signal cannot be received in response to the authentication request signal even though the vehicle has determined that the portable device exists in the vicinity of the vehicle. In this state, it is found that the battery of the portable device may be suddenly consumed in a case where the vehicle repeatedly transmits the call signal to the portable device and the portable device returns the response signal each time receiving the call signal.

The present disclosure provides an in-vehicle authentication device and a portable device authentication method each of which can more reliably reduce battery consumption of the portable device.

An example embodiment of the present disclosure provides an in-vehicle authentication device. The in-vehicle authentication device includes a wireless communication unit, a call signal transmission unit, an authentication request signal transmission unit, an authentication execution unit, a no-authentication signal state detection unit, and a transmission stop unit. The wireless communication unit performs wireless communication with a portable device in a vicinity of a vehicle. The call signal transmission unit transmits a call signal that requests a reply of a response signal to the portable device via the wireless communication unit. The authentication request signal transmission unit. The authentication request signal transmission unit transmits an authentication request signal that requests a reply of an authentication signal via the wireless communication unit when the response signal is received via the wireless communication unit. The authentication execution unit authenticates the portable device that transmits the authentication signal based on the authentication signal when the authentication signal is received via the wireless communication unit. The no-authentication signal state detection unit detects a no-authentication signal state in which the authentication signal is not received in response to the authentication request signal. The transmission stop unit stops the transmission of the call signal until a predetermined period of time elapses when the no-authentication signal state is detected.

In the example embodiment of the present disclosure, when the no-authentication signal state, in which the authentication signal cannot be received even when the authentication request signal is transmitted, is detected, transmission of the call signal is stopped until a predetermined period of time has elapsed. Thus, the configuration can reduce the sudden consumption of the battery of the portable device in a case where the in-vehicle authentication device repeatedly transmits the call signal to the portable device and the portable device returns the response signal each time receiving the call signal.

Another example embodiment of the present disclosure provides a portable device authentication method. The portable device authentication method comprising: performing wireless communication with a portable device in a vicinity of a vehicle; transmitting a call signal that requests a reply of a response signal to the portable device; determining whether the response signal is received; transmitting an authentication request signal that requests a reply of an authentication signal when the response signal is received; authenticating the portable device that transmits the authentication signal based on the authentication signal when the authentication signal is received; detecting a no-authentication signal state in which the authentication signal is not received in response to the authentication request signal; and stopping the transmission of the call signal until a predetermined period of time elapses when the no-authentication signal state is detected.

In another example embodiment of the present disclosure, when the no-authentication signal state, in which the authentication signal cannot be received even when the authentication request signal is transmitted, is detected, transmission of the call signal is stopped until a predetermined period of time has elapsed. Thus, the configuration can reduce the sudden consumption of the battery of the portable device in a case where the in-vehicle authentication device repeatedly transmits the call signal to the portable device and the portable device returns the response signal each time receiving the call signal.

Hereinafter, embodiments will be described in order to clarify the contents of the present disclosure described above.

Figure 1B:
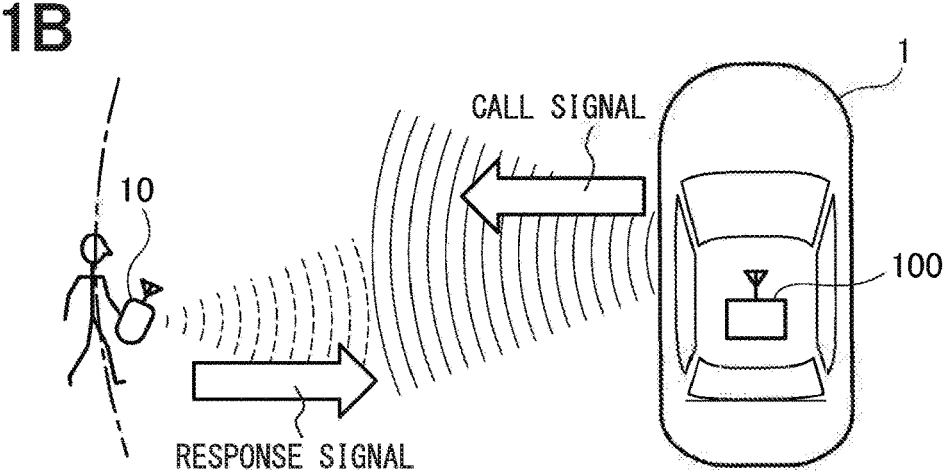
FIG. 1B is a diagram showing a situation in which the portable device is entering the reach of radio wave from the in-vehicle authentication device.
Figure 1C:
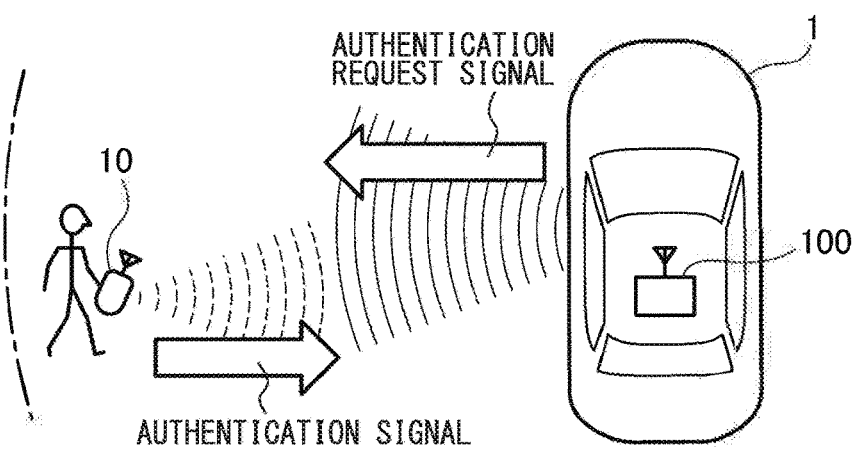
FIG. 1C is a diagram showing a situation in which the in-vehicle authentication device authenticates the user's portable device.

FIGS. 1A to 1C exemplify a configuration in which an in-vehicle authentication device 100 of the present embodiment mounted on a vehicle 1 authenticates a user's portable device 10. As shown in the figures, the in-vehicle authentication device 100 periodically transmits a call signal (known as a Wake signal) that requests a response of a response signal to the portable device 10 existing around the vehicle 1. As shown in FIG. 1A, when the portable device 10 does not exist within a reachable range of the radio wave transmitted from the in-vehicle authentication device 100, the call signal does not reach the portable device 10, so that the portable device 10 does not transmit the response signal. As shown in FIG. 1B, when the portable device 10 enters the reachable range of the radio wave transmitted from the in-vehicle authentication device 100, the portable device 10 receives the call signal from the in-vehicle authentication device 100 and transmits a response signal (known as an Ack signal) in response to the call signal.

When the in-vehicle authentication device 100 receives the response signal, the in-vehicle authentication device 100 recognizes that the portable device 10 has approached the reachable range of the radio wave. Thus, the in-vehicle authentication device 100 transmits an authentication request signal (known as a Challenge signal) that requests a response of an authentication signal, as shown in FIG. 1C, so as to authenticate the portable device 10. Since the authentication signal (known as a Response signal) is transmitted from the portable device 10, the in-vehicle authentication device 100 authenticates the portable device 10 based on the authentication signal.

As described above, even though the in-vehicle authentication device 100 of the vehicle 1 needs to periodically transmit the call signal, the portable device 10 transmits a response signal or an authentication signal when respectively receiving the call signal or the authentication request signal. Therefore, the power consumption of the portable device 10 can be reduced. However, for some reason, it has been observed that the power consumption of the portable device 10 suddenly increases, and the battery is consumed. Therefore, the in-vehicle authentication device 100 of the present embodiment has the following internal structure in order to take measures against such a difficulty by the vehicle 1.

Figure 2:
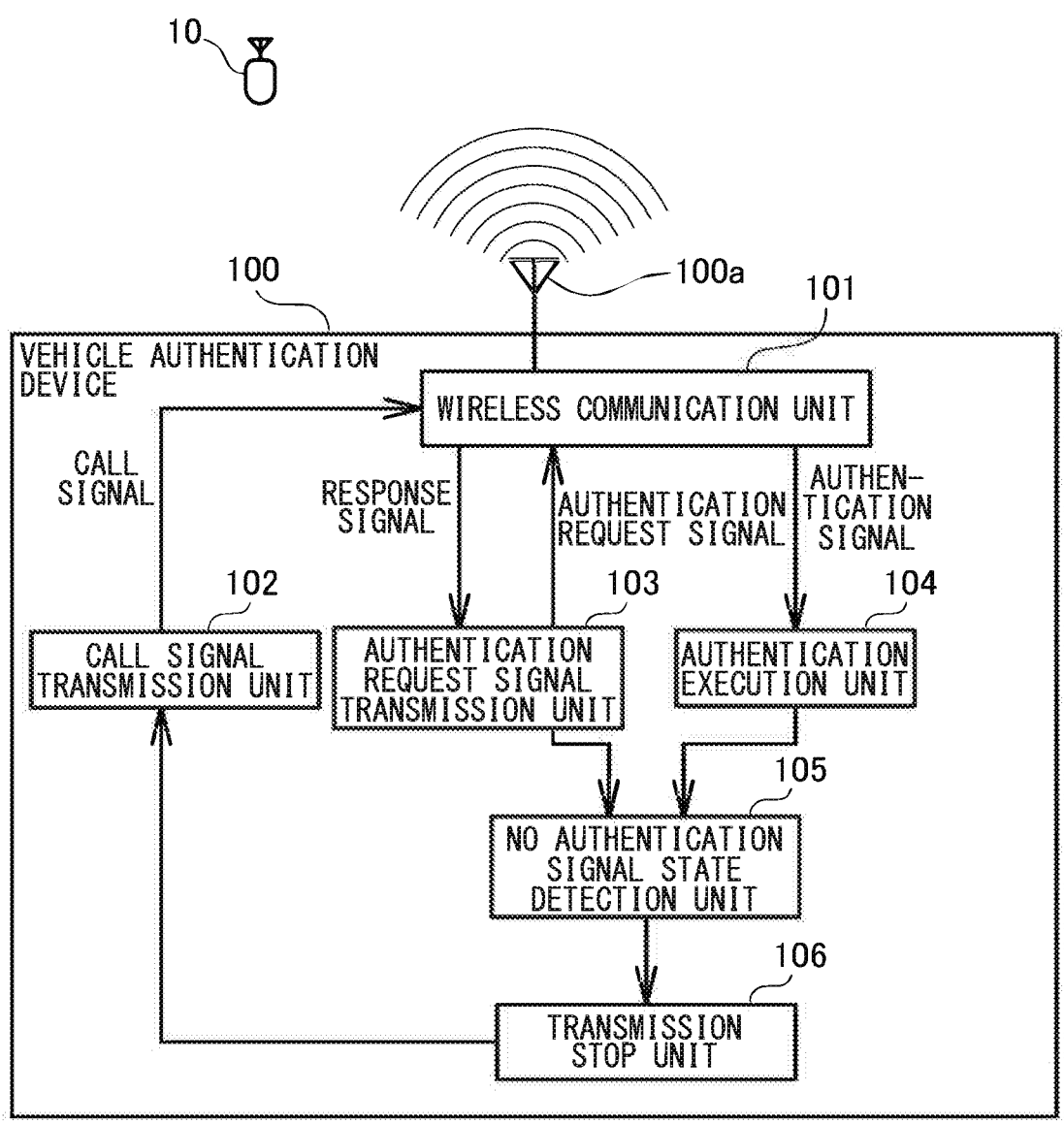
FIG. 2 is a diagram showing an internal structure of the in-vehicle authentication device according to a present embodiment.

FIG. 2 shows the internal structure of the in-vehicle authentication device 100 according to the present embodiment. As shown in the figure, the in-vehicle authentication device 100 of the present embodiment includes a wireless communication unit 101, a call signal transmission unit 102, an authentication request signal transmission unit 103, an authentication execution unit 104, a no-authentication signal state detection unit 105, a transmission stop unit 106, or the like.

These "units" are an abstract concept classifying the inside of the in-vehicle authentication device 100 for the sake of convenience, and does not represent that the in-vehicle authentication device 100 is physically divided into these "units". In the classification, functions included in the in-vehicle authentication device 100 is focused in order that the in-vehicle authentication device 100 takes measures against the increase in power consumption of the portable device 10. Those "units" can be realized as a computer program executed by a CPU, can be realized as an electronic circuit including an LSI, or can be realized as a combination of the computer program with the electronic circuit.

The wireless communication unit 101 is connected to an antenna 100a of the in-vehicle authentication device 100. The wireless communication unit 101 drives the antenna 100a to transmit a radio wave or receive a radio wave.

The call signal transmission unit 102 periodically transmits a call signal to the wireless communication unit 101. When the wireless communication unit 101 receives the call signal from the call signal transmission unit 102, the wireless communication unit 101 drives the antenna 100a in response to the call signal to wirelessly transmit the radio wave of the call signal. When the radio wave of the response signal is returned from the portable device 10 that has received the call signal, the wireless communication unit 101 receives the response signal using the antenna 100a and transmits the response signal to the authentication request signal transmission unit 103.

The authentication request signal transmission unit 103 transmits an authentication request signal to the wireless communication unit 101 after receiving the response signal from the wireless communication unit 101. The authentication request signal transmission unit 103 transmits the information to the effect that the authentication request signal transmission unit 103 has transmitted the authentication request signal to the no-authentication signal state detection unit 105. When the wireless communication unit 101 receives the authentication request signal from the authentication request signal transmission unit 103, the wireless communication unit 101 drives the antenna 100a in response to the authentication request signal to wirelessly transmit the radio wave of the authentication request signal. When the radio wave of the authentication signal is returned from the portable device 10 that has received the authentication request signal, the wireless communication unit 101 receives the authentication signal using the antenna 100a and transmits the authentication signal to the authentication execution unit 104.

The authentication execution unit 104 transmits the information to the effect that the authentication execution unit 104 has received the authentication signal to the no-authentication signal state detection unit 105 and authenticates, based on the authentication signal, the portable device 10 that has transmitted the authentication signal after receiving the authentication signal from the wireless communication unit 101.

The no-authentication signal state detection unit 105 is connected to the authentication request signal transmission unit 103 and the authentication execution unit 104. The no-authentication signal state detection unit 105 receives the information to the effect that the authentication request signal transmission unit 103 has transmitted the authentication request signal (that is, the information to the effect that the authentication request signal transmission unit 103 has transmitted the radio wave of the authentication request signal) and the information to the effect that the authentication execution unit 104 has received the authentication signal. Based on the information, the no-authentication signal state detection unit 105 detects a state in which the authentication signal is not returned even though the response signal is returned from the portable device 10 (hereinafter referred to as a no-authentication signal state). That is, since the authentication request signal is transmitted when the response signal from the portable device 10 is received, the fact that the authentication request signal is transmitted indicates that the portable device 10 exists within the radio wave reachable range and the response signal from the portable device 10 is received. When the authentication request signal is transmitted in such a situation, it is assumed that the authentication signal will be returned in response to the authentication request signal. The no-authentication signal state detection unit 105 detects the state in which the authentication signal has not been received even in the above described situation.

It has been described that information indicating that the authentication request signal has been transmitted is output from the authentication request signal transmission unit 103 to the no-authentication signal state detection unit 105. The response signal is received before the authentication request signal is transmitted. In this configuration, the authentication request signal transmission unit 103 may transmit the information to the effect that the authentication request signal transmission unit 103 has received the response signal instead of the information to the effect that the authentication request signal transmission unit 103 has transmitted the authentication request signal to the no-authentication signal state detection unit 105. In this case, the no-authentication signal state detection unit 105 detects, as the no-authentication signal state, the state in which the no-authentication signal state detection unit 105 does not receive the information to the effect that the authentication signal is received from the authentication execution unit 104 even though the no-authentication signal state detection unit 105 receives the information to the effect that the response signal is received from the authentication request signal transmission unit 103.

The information to the effect that the response signal is received and the information to the effect that the authentication request signal is transmitted may be transmitted from the authentication request signal transmission unit 103 to the no-authentication signal state detection unit 105.

When the transmission stop unit 106 receives the information whether the no-authentication signal state is detected from the no-authentication signal state detection unit 105, the transmission stop unit 106 determines whether to stop transmitting the call signal. For example, when the no-authentication signal state continues for a predetermined number of times of 1 or more, the transmission stop unit 106 determines to stop transmitting the call signal for a predetermined period of time, and outputs the fact to the call signal transmission unit 102.

The in-vehicle authentication device 100 according to the present embodiment having the internal structure as described above can reduce the battery of the portable device 10 from being suddenly consumed. As a preparation for explaining this reason, the reason why the battery 10 is suddenly consumed in the portable device 10 will be described.

Figure 3A:
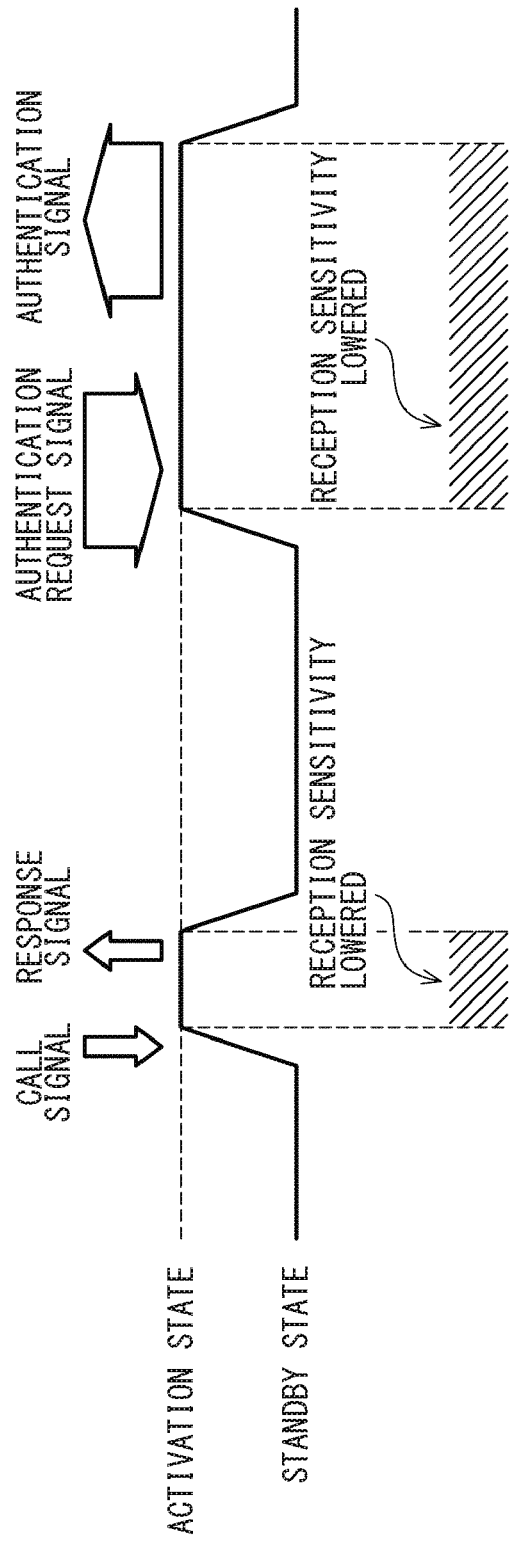
FIG. 3A is a timing chart showing states of the portable device when an authentication is performed with the in-vehicle authentication device.
Figure 3B:
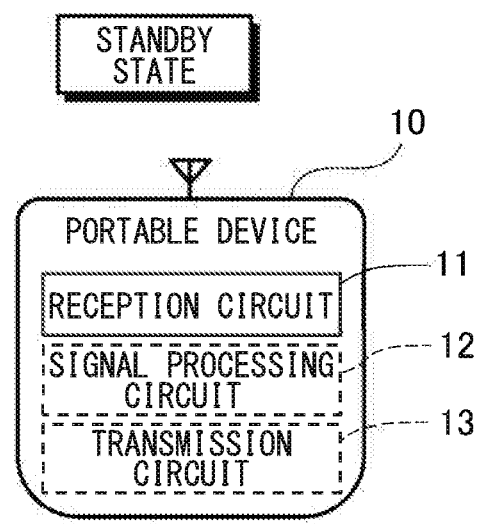
FIG. 3B is a diagram showing a standby state of the portable device.
Figure 3C:
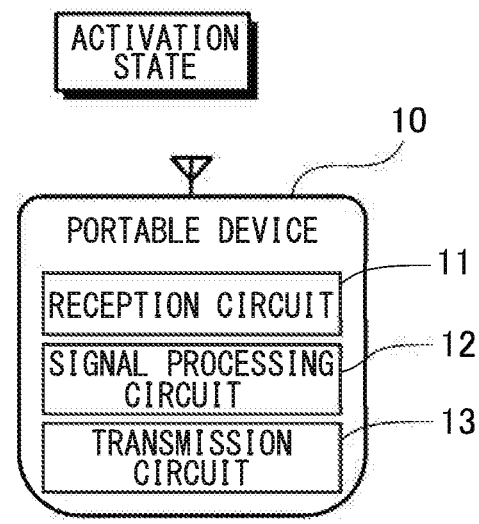
FIG. 3C is a diagram showing an activation state of the portable device.

FIGS. 3A to 3C show the operation of the portable device 10 for performing the authentication with the in-vehicle authentication device 100. As shown in FIG. 3A, the portable device 10 performs the transmission and reception of the radio wave between the in-vehicle authentication device 100 while repeating the standby state and the activation state. The portable device 10 includes a reception circuit 11, a signal processing circuit 12, and a transmission circuit 13. The reception circuit 11 receives the radio wave. The signal processing circuit 12 processes the received radio wave. The transmission circuit 13 transmits the radio wave. As shown in FIG. 3B, the standby state indicates that the reception circuit 11 is operating but the signal processing circuit 12 and a transmission circuit 13 are not operating. Since the signal processing circuit 12 and the transmission circuit 13 need to operate after receiving the radio wave, the operation is stopped until the radio wave is received. Thus, the configuration can reduce the consumption of the battery. On the other hand, the reception circuit 11 operates so that the call signal from the in-vehicle authentication device 100 can be received whenever it arrives. For this reason, the portable device 10 is in the standby state when the radio wave is not received.

In FIG. 3B, the reception circuit 11 is represented by a solid line, and the signal processing circuit 12 and the transmission circuit 13 are represented by broken lines. FIG. 3B shows the state in which the reception circuit 11 is operating but the signal processing circuit 12 and the transmission circuit 13 are not operating.

Then, as shown in FIG. 3A, when the portable device 10 receives the call signal from the in-vehicle authentication device 100 in the standby state, the portable device 10 becomes the activation state. As shown in FIG. 3C, in the activation state of the portable device 10, the signal processing circuit 12 and the transmission circuit 13 are operating. The portable device 10 is capable of performing the predetermined signal processing in response to the received call signal and transmitting the response signal. As shown in FIG. 3A, after transmitting the response signal, the portable device 10 returns to the standby state.

Thereafter, when the authentication request signal transmitted from the in-vehicle authentication device 100 in response to the response signal is received, the portable device 10 becomes the activation state. Then, the portable device 10 performs the predetermined signal processing on the authentication request signal, transmits the authentication signal, and then restores the state to the standby state.

Here, when the standby state is switched to the activation state, the operation of the signal processing circuit 12 and the transmission circuit 13 that have been stopped is started, so that the current consumption in the portable device 10 increases. As a result, it has been found that the amount of current supplied to the reception circuit 11 is insufficient, and the reception sensitivity for the radio wave decreases. This phenomenon has been overlooked for a long time because the phenomenon does not occur while the battery of the portable device 10 is new. When the battery is used for a while and the current supply capability starts to decrease, the reception sensitivity decreases by about 1 db.

Since the call signal (so-called a Wake signal) is provided by a short signal with a small amount of data, as shown in FIG. 3A, the reception is completed before the operation of the signal processing circuit 12 and the transmission circuit 13 starts (that is, before the reception sensitivity decreases). On the other hand, since the authentication request signal (so-called a Challenge signal) is provided by a long signal with a large amount of data, the reception will not be completed before the operation of the signal processing circuit 12 and the transmission circuit 13 starts. As a result, even when the signal processing circuit 12 and the transmission circuit 13 operates and the reception sensitivity is lowered, the reception is continued, and in some cases, the authentication request signal may not be received.

Even when such a phenomenon occurs, in many cases, the owner of the portable device 10 approaches the vehicle 1, so that the above described situation does not occur. When the owner of the portable device 10 stops on the way to the vehicle 1, a situation may occur in which the power consumption of the portable device 10 is greatly increased and the battery is suddenly consumed.

Figure 4A:
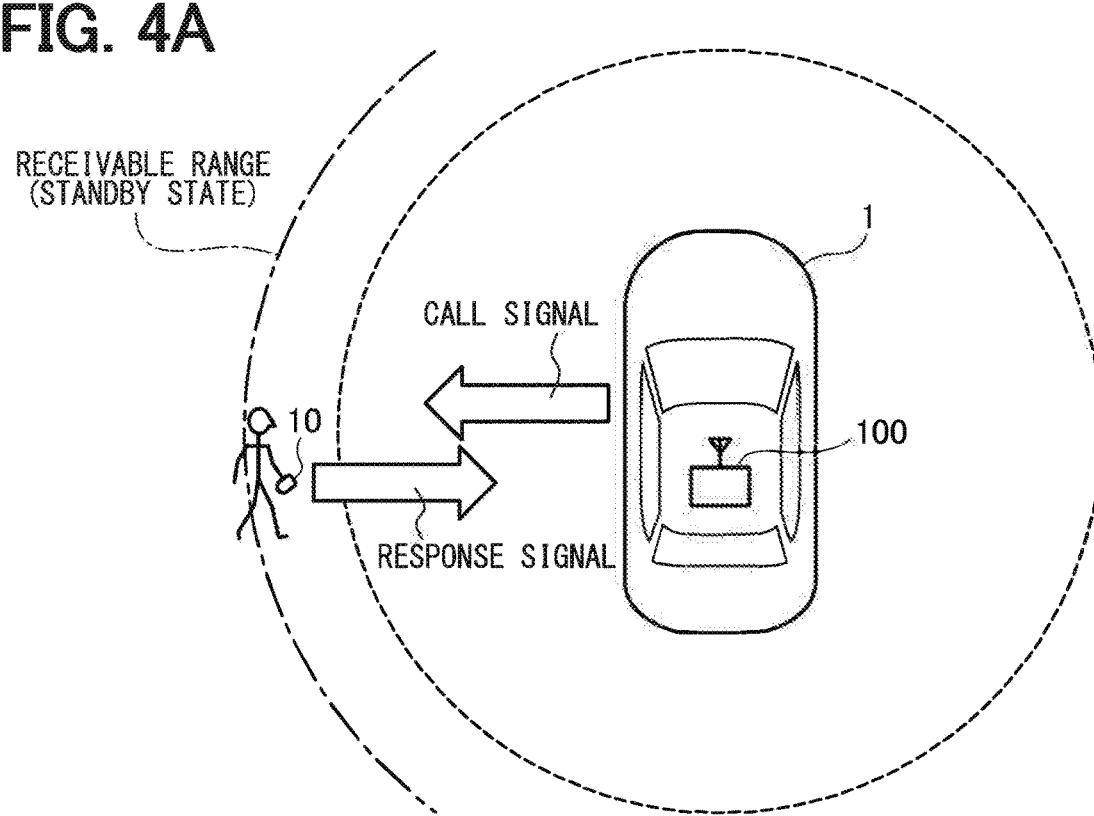
FIG. 4A is a diagram showing a situation in which the portable device is entering a receivable range of radio wave in the standby state from the in-vehicle authentication device.
Figure 4B:
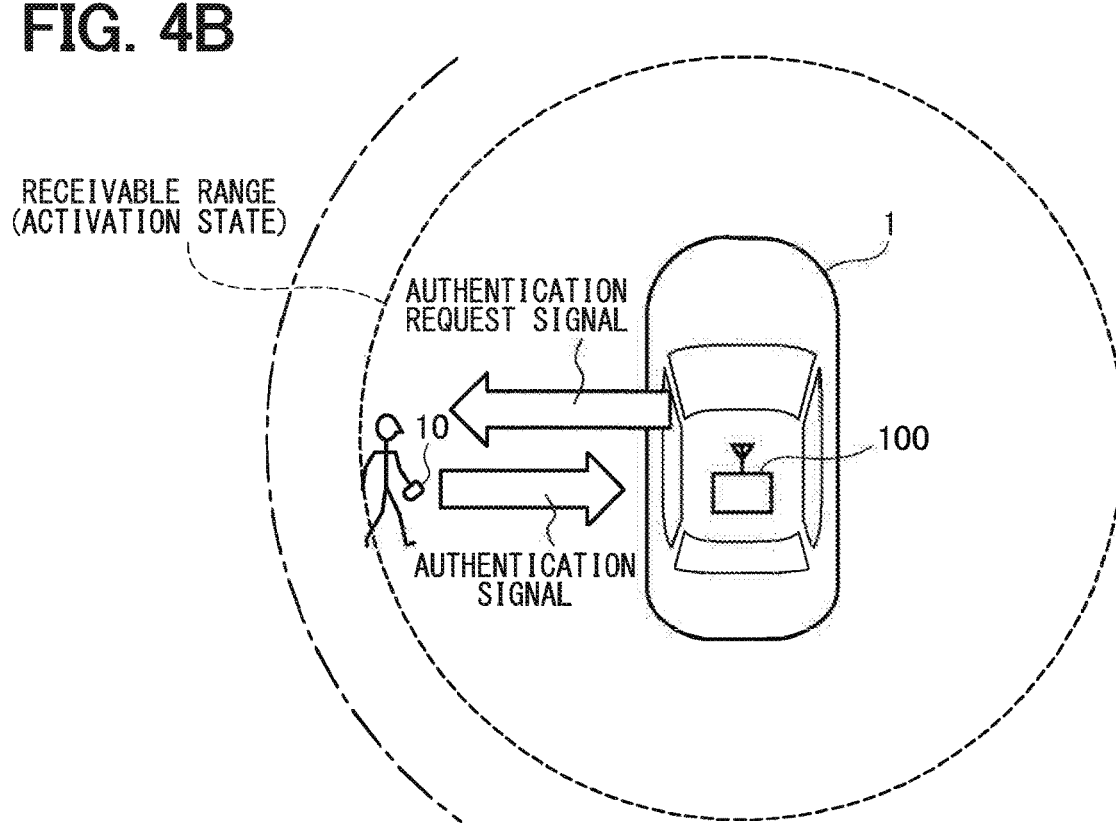
FIG. 4B is a diagram showing a situation in which the portable device is entering a receivable range of the activation state for radio wave from the in-vehicle authentication device.

FIGS. 4A and 4B show a state in which the in-vehicle authentication device 100 authenticates the portable device 10 in a situation where the owner of the portable device 10 approaches the vehicle 1. A range shown by the dash-dot line in FIGS. 4A and 4B indicates a receivable range for the radio wave transmitted from the in-vehicle authentication device 100 when the portable device 10 is in the standby state. A range shown by the broken line indicates a receivable range for the radio wave when the portable device 10 is in the activation state. As described above, when the portable device 10 is in the activation state, the reception sensitivity is lower than that in the standby state. Therefore, the receivable range in the activation state shown by the broken line is smaller than the receivable range in the standby state shown by the dash-dot line.

As shown in FIG. 4A, when the portable device 10 enters the receivable range in the standby state, the portable device 10 is capable of receiving the call signal from the in-vehicle authentication device 100. Since the call signal is the short signal, the reception is immediately completed, and the portable device 10 transmits the response signal to the in-vehicle authentication device 100. Then, the authentication request signal is transmitted from the in-vehicle authentication device 100.

The owner of the portable device 10 may be approaching the vehicle 1. In this case, the portable device 10 receives the call signal from the in-vehicle authentication device 100 and transmits the response signal. The portable device 10 moves to the receivable range in the activation state shown by the broken line while the authentication request signal in response to the response signal is received. With this configuration, as shown in FIG. 4B, the portable device 10 can receive the authentication request signal from the in-vehicle authentication device 100 and transmit the authentication signal in response to the authentication request signal.

Figure 5A:
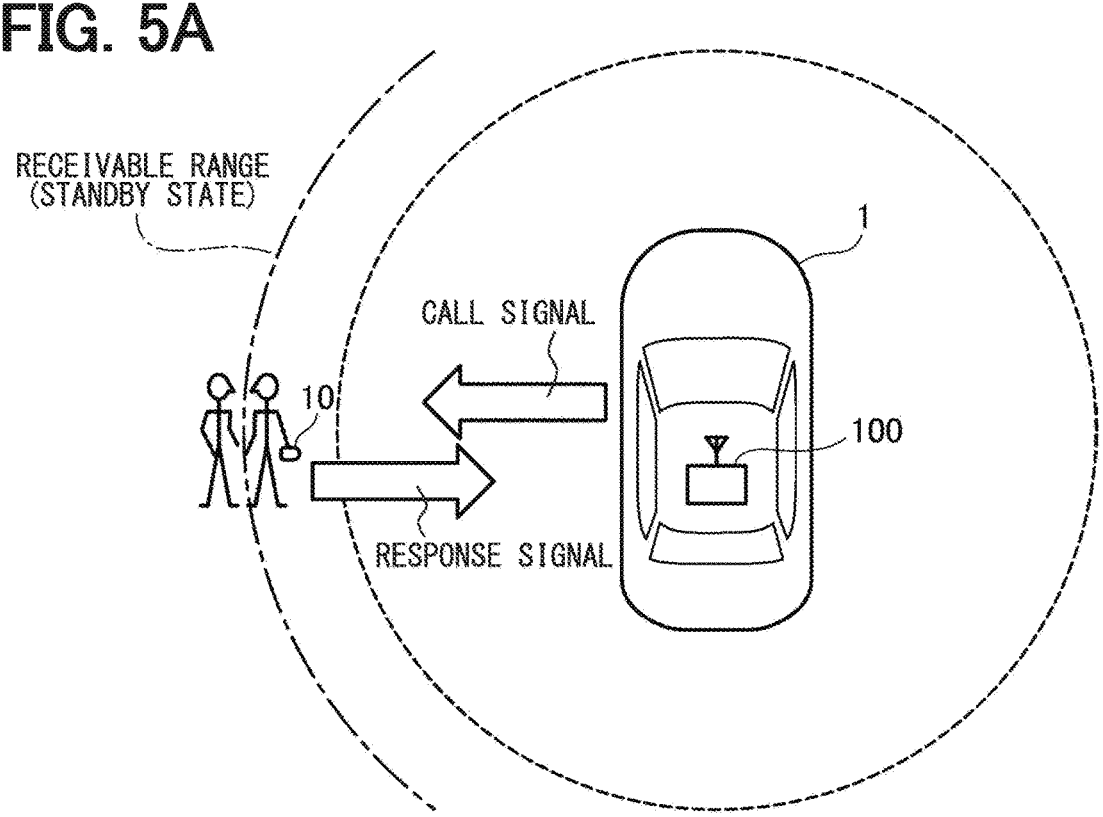
FIG. 5A is a diagram showing a situation in which the portable device exists between the receivable range in the standby state of the portable device and the receivable range in the activation state of the portable device, and the in-vehicle authentication device transmits the call signal.
Figure 5B:
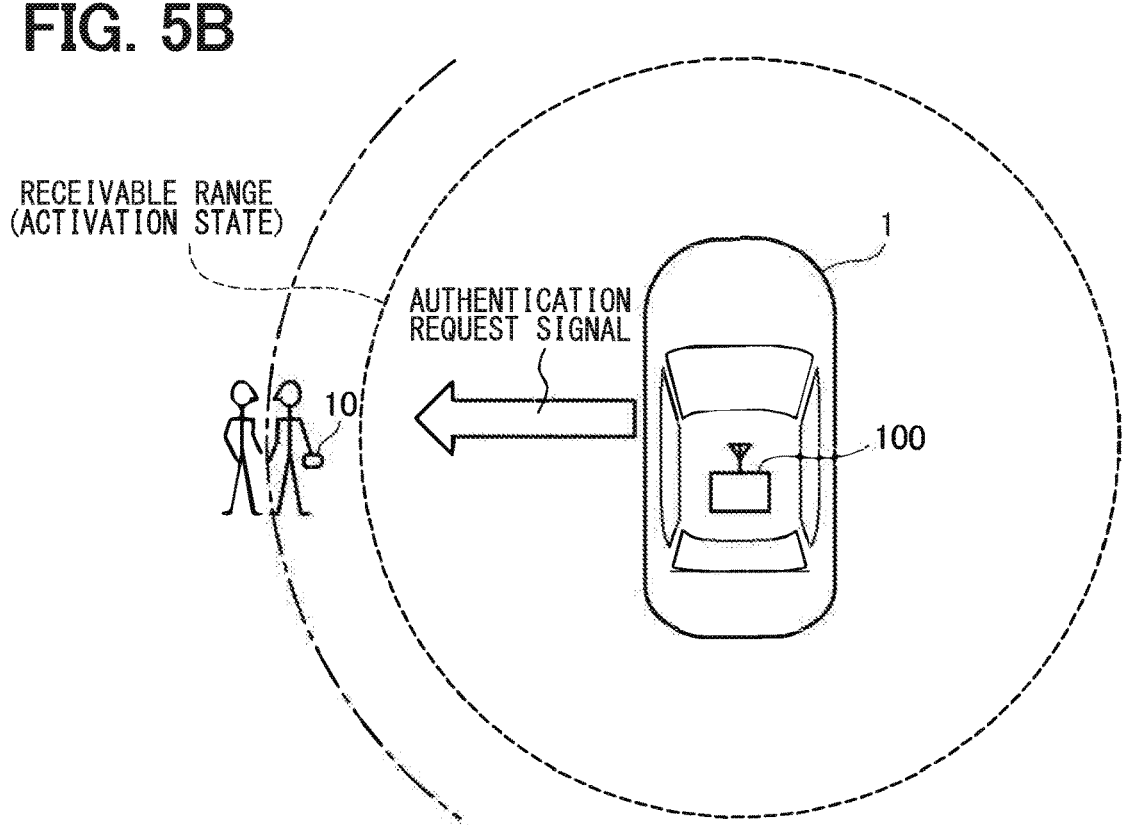
FIG. 5B is a diagram showing a situation in which the portable device exists between the receivable range in the standby state of the portable device and the receivable range in the activation state of the portable device, and the in-vehicle authentication device transmits the authentication request signal.

On the other hand, even though the owner of the portable device 10 has approached the vehicle 1 within the receivable range in the standby state, the owner may not approach further for some reason. FIGS. 5A and 5B show, as an example, a case where the owner of the portable device 10 starts talking in a place that falls within the receivable range in the standby state.

In this case, as described above with reference to FIG. 3A, the reception of a short signal such as the call signal can be completed before the reception sensitivity of the portable device 10 is lowered (see FIG. 5A). When a long signal such as the authentication request signal is received, the portable device 10 is switched to the activation state. Thus, the portable device 10 comes out of the receivable range of the authentication request signal in the activation state (see FIG. 5B). For this reason, the in-vehicle authentication device 100 determines that the portable device 10 is gone because the authentication signal does not return despite the transmission of the authentication request signal, and transmits the call signal again. Since the portable device 10 cannot receive the signal while receiving the authentication request signal, the portable device 10 determines that the portable device 10 has moved away from the vehicle 1 and switches from the activation state to the standby state again.

Since the call signal is provided by the short signal as described above, the reception can be completed before the portable device 10 switches from the standby state to the activation state, and the response signal is returned from the portable device 10 (see FIG. 5A). The authentication request signal is provided by the long signal. Thus, when the authentication request signal is transmitted again from the in-vehicle authentication device 100, the portable device 10 switches from the standby state to the activation state in the middle of the reception of the authentication request signal and the reception cannot be completed. For this reason, since the authentication signal is not returned from the portable device 10 (see FIG. 5B), the in-vehicle authentication device 100 transmits the call signal again.

As described above, the owner of the portable device 10 may have approached the vehicle 1 within the receivable range in the standby state, but may not approach any further. In this case, the in-vehicle authentication device 100 transmits the call signal to the portable device 10 many times, and each time the portable device 10 returns the response signal. As a result, it is considered that the battery of the portable device 10 is suddenly consumed. Therefore, the in-vehicle authentication device 100 according to the present embodiment authenticates the portable device 10 by the following method in order to reduce such a situation.

Figure 6:
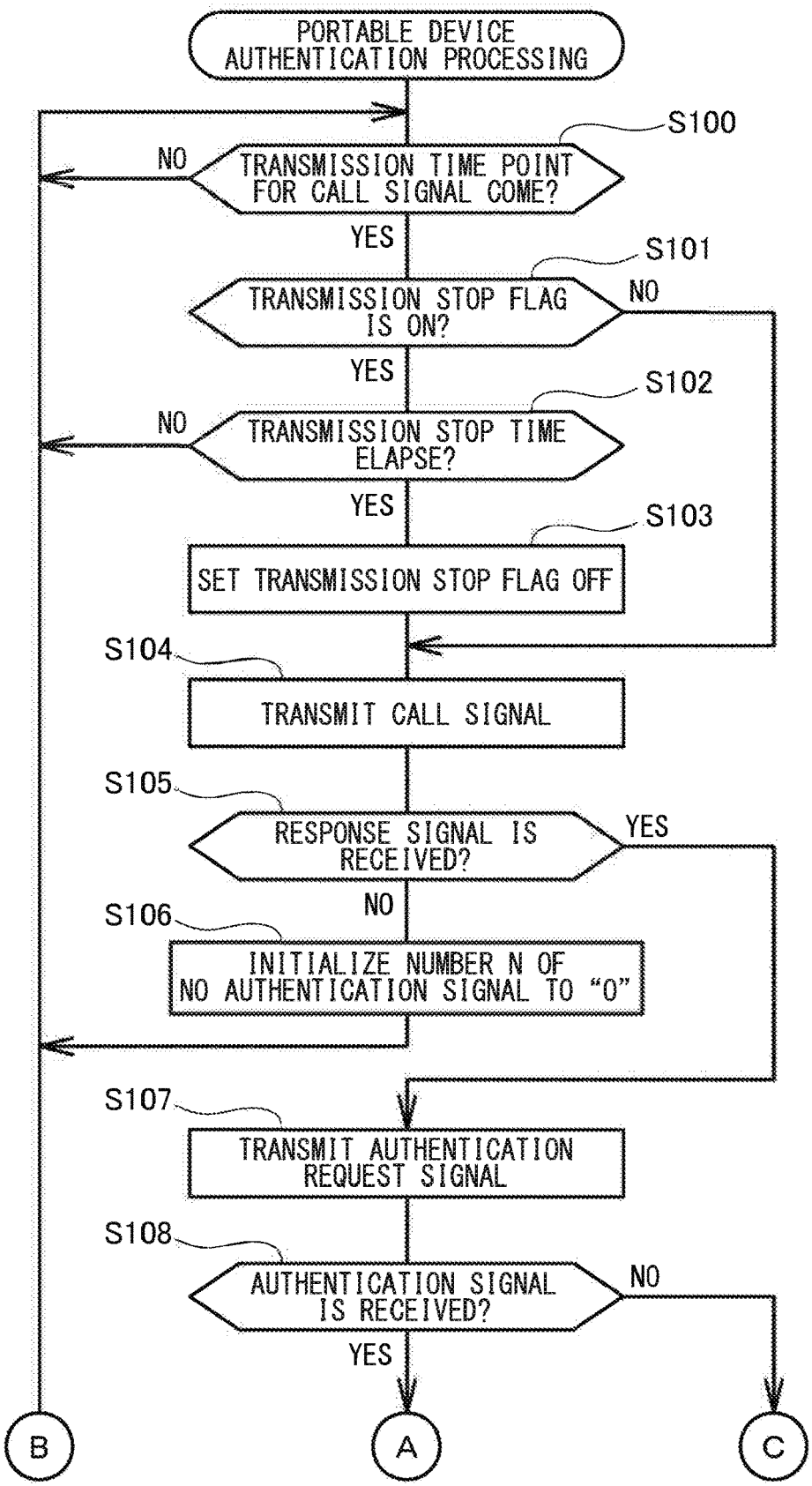
FIG. 6 is a flowchart showing a former half of a portable device authentication processing according to the present embodiment in which the in-vehicle authentication device authenticates the portable device.
Figure 7:
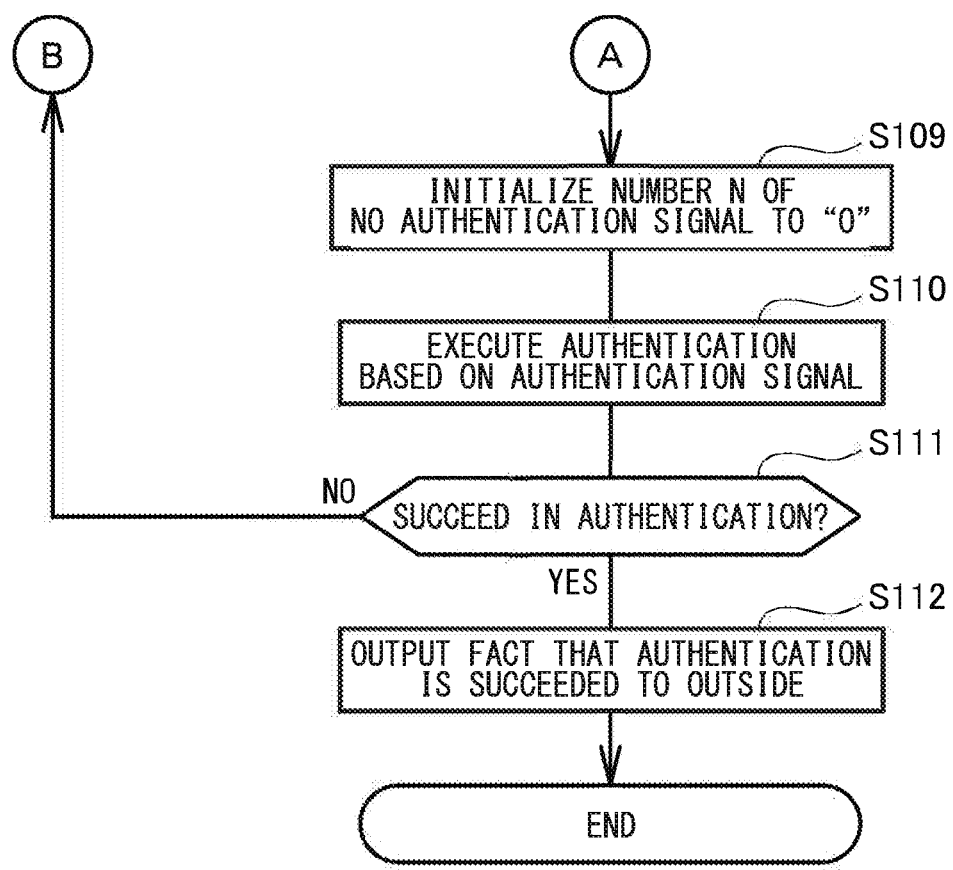
FIG. 7 is a flowchart showing a part of latter half of the portable device authentication processing according to the present embodiment.
Figure 8:
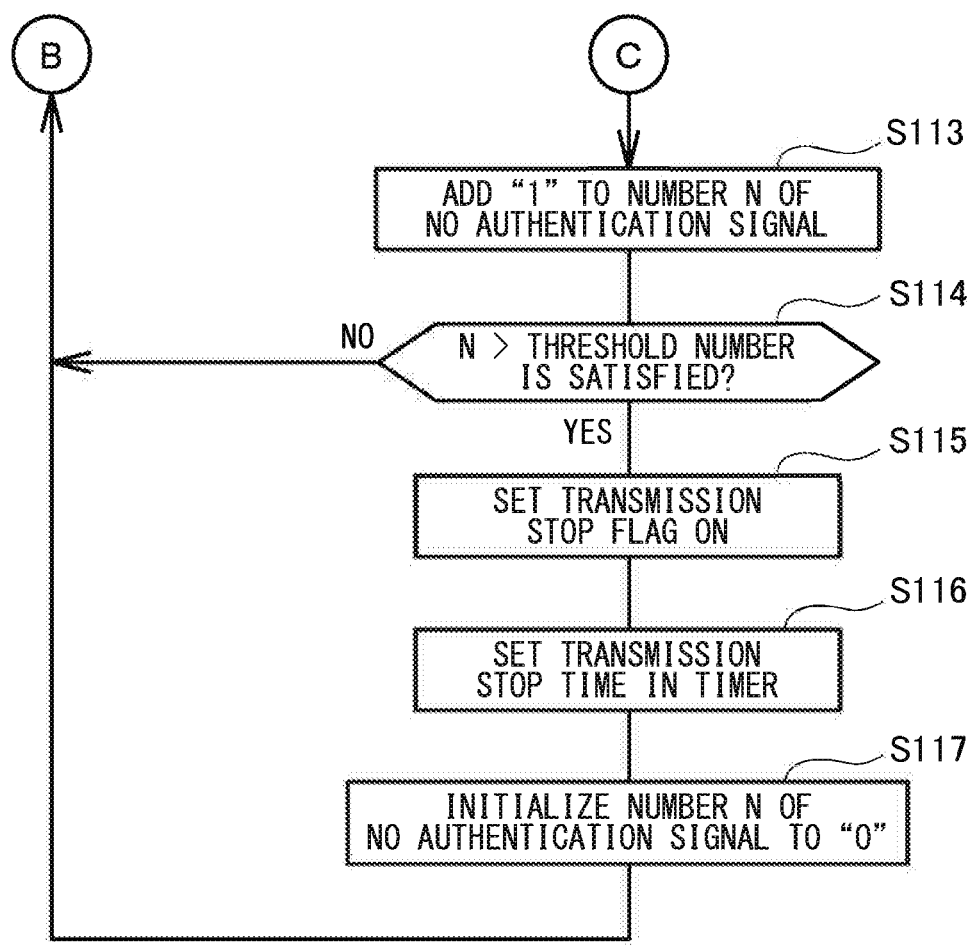
FIG. 8 is a flowchart showing a remaining part of latter half of the portable device authentication processing according to the present embodiment.

FIGS. 6 to 8 show a flowchart of a portable device authentication processing to authenticate the portable device 10 by the in-vehicle authentication device 100 according to the present embodiment.

As shown in the figures, in the portable device authentication processing, the in-vehicle authentication device 100 determines whether a time point for transmitting the call signal has arrived (S100). Since the call signal is transmitted at a constant cycle, when the elapsed time since the previous call signal was transmitted does not reach the predetermined period of time, the in-vehicle authentication device 100 determines that the time point for transmitting the call signal has not arrived (S100: no). Further, when a genuine portable device 10 has already been authenticated, the in-vehicle authentication device 100 determines that the time point for transmitting the call signal has not arrived (S100: no). When the in-vehicle authentication device 100 determines that the time point for transmitting the call signal has not arrived (S100: no), the same determination (S100) is repeated and the in-vehicle authentication device 100 enters a waiting state until determining that the time point for transmitting the call signal has arrived.

On the other hand, when the predetermined period of time has passed since the previous call signal was transmitted and the genuine portable device 10 has not been authenticated, the in-vehicle authentication device 100 determines that the time point for transmitting the call signal has arrived (S100: yes) and determines whether a transmission stop flag is turned ON (S101). The transmission stop flag is a flag indicating whether or not to stop transmitting the call signal. Normally, the transmission stop flag is set to OFF. When a predetermined condition described later is satisfied, the transmission stop flag is turned ON. In this case, at S101, it is determined as "yes", and the in-vehicle authentication device 100 determines whether a transmission stop time has elapsed (S102). The transmission stop time is set as a time period for which the flag keeps ON when the transmission stop flag is turned ON. The processes for setting the transmission stop flag to ON and the processes for setting the transmission stop time will be described in detail later.

As a result, when the transmission stop time has not yet elapsed (S102: no), the in-vehicle authentication device 100 returns to the first process without transmitting the call signal and determines whether the time point for transmitting the call signal has arrived (S100).

In contrast, when the transmission stop time has elapsed (S102: yes), the in-vehicle authentication device 100 causes the transmission stop flag set to ON to be returned to OFF (S103), and then transmits the call signal (S104).

On the other hand, when the transmission stop flag is not set to ON (S101: no), the in-vehicle authentication device 100 transmits the call signal (S104) without confirming the transmission stop time (S102) and returning the transmission stop flag to OFF (S103).

After the in-vehicle authentication device 100 transmits the call signal (S104), the in-vehicle authentication device 100 determines whether the response signal transmitted from the portable device 10 is received (S105). When the portable device 10 exists within the reach of the radio wave of the transmitted call signal, the response signal should be returned within a certain time after the call signal is transmitted. Therefore, when the in-vehicle authentication device 100 cannot receive the response signal within a certain time (S105: no), the number N of no-authentication signals is initialized to "0" (S106) and the in-vehicle authentication device 100 returns to the first process to determine whether a time point for transmitting the call signal has arrived (S100). The number N of no-authentication signals is a variable for counting the number of times of the consecutive occurrence of the no-authentication signal state and is used for setting the transmission stop flag to ON. The in-vehicle authentication device 100 transmits the call signal (S104), but cannot receive the response signal (S105: no). In this case, even though the no-authentication signal state consecutively occurred until then, the no-authentication signal state is interrupted. Thus, the number N of no-authentication signals is initialized to "0". The no-authentication signal state is a state where the authentication signal does not return even though the authentication request signal is transmitted after the response signal is returned in response to the call signal.

On the other hand, when the response signal from the portable device 10 is received (S105: yes), after the authentication request signal is transmitted (S107), the in-vehicle authentication device 100 determines whether the authentication signal from the portable device 10 is received (S108). Normally, the authentication signal from the portable device 10 is returned within a certain period of time after the authentication request signal is transmitted.

As a result, when the authentication signal is received (S108: yes), the number N of no-authentication signals is initialized to "0" (S109 in FIG. 7). As described above, the number N of no-authentication signals is the variable used for counting the number of times of the consecutive occurrence of the no-authentication signal state. Even though the no-authentication signal state consecutively occurred until then, the no-authentication signal state is interrupted by receiving the authentication signal (S108: yes). Thus, the number N of no-authentication signals is initialized to "0".

Thereafter, the in-vehicle authentication device 100 authenticates the portable device 10 based on the received authentication signal (S110), and determines whether the authentication succeeds (S111). When the authentication succeeds (S111: yes), the in-vehicle authentication device 100 transmits the fact that the authentication succeeds to the outside (S112) and terminates the above described portable device authentication processing according to the present embodiment.

On the other hand, when the authentication fails (S111: no), the in-vehicle authentication device 100 determines that the authenticated portal device 10 is not a genuine portal device 10. Thus, in order to authenticate a genuine portal device 10, the in-vehicle authentication device 100 returns to the first process of the processing, and again determines whether the time point for transmitting the call signal has arrived (S100 in FIG. 6).

The processes have been described for authenticating the portable device 10 based on the authentication signal when the authentication signal in response to the authentication request signal can be received (S108: yes).

When the authentication request signal is transmitted, the authentication signal may not be received. That is, the authentication request signal is a signal that is transmitted when the response signal is returned, and that the response signal is returned indicates that the portable device 10 is present in a range where the call signal reaches. Under usual situation, the authentication signal is to be received. The portable device 10 may move away after the call signal is transmitted and before the authentication request signal is transmitted, or, as shown in FIGS. 5A and 5B, the portable device 10 stays at the place where the call signal is received. In this case, a case where the authentication signal cannot be received even though the authentication request signal is transmitted can occur (that is, no-authentication signal state).

When the authentication signal is not received even though the authentication request signal is transmitted (S108: no), "1" is added to the number N of no-authentication signals (S113 in FIG. 8). Subsequently, the in-vehicle authentication device 100 determines whether the number N of no-authentication signals is greater than a predetermined threshold number (S114). The threshold number can be set to an appropriate value. In the present embodiment, the threshold number is set to three.

As a result, when the number N of no-authentication signals has not reached the threshold number (S114: no), the in-vehicle authentication device 100 returns to the first process of the processing and determines again whether the time point for transmitting the call signal has arrived (S100 in FIG. 6). When the in-vehicle authentication device 100 determines that the time point for transmitting the call signal has arrived (S100: yes), the transmission stop flag remains OFF (S101: no). When the in-vehicle authentication device 100 transmits the call signal (S104) and receives the response signal corresponding to the call signal (S105: yes), the in-vehicle authentication device 100 transmits the authentication request signal (S107) and determines whether the authentication signal is received (S108). When the authentication signal is not received (S108: no), the in-vehicle authentication device 100 determines whether the number N of no-authentication signals has reached the predetermined threshold number (S114) after adds "1" again to the number N of no-authentication signals (S113 in FIG. 8).

While the in-vehicle authentication device 100 repeats such processes, the response signal in response to the call signal may not be received (S105 in FIG. 6: no) or the authentication signal in response to the authentication request signal may be received (S108: yes). In this case, the number N of no-authentication signals is initialized to "0" (S106 in FIG. 6 or S109 in FIG. 7).

When the number N of no-authentication signals reaches the threshold number (S114 in FIG. 8: yes), after setting the transmission stop flag to ON (S115), the in-vehicle authentication device 100 sets the transmission stop time in the timer (S116). As described above, the transmission stop flag is a flag indicating whether or not to stop the transmission of the call signal, and the transmission stop time is a time for which the transmission stop flag is set to ON. As described above, while the transmission stop flag is set to ON (S101: yes in FIG. 6), the in-vehicle authentication device 100 stops the transmission of the call signal until the transmission stop time elapses (S102: yes) and the transmission stop flag is returned to OFF (S103).

The number N of no-authentication signals is the variable used for setting the transmission stop flag to ON. After the transmission stop flag is set to ON, the number N of no-authentication signals is initialized to "0" (S117) in preparation for the next time the transmission stop flag is turned ON, and then the in-vehicle authentication device 100 returns to the first process of the processing again. Thus, the in-vehicle authentication device 100 repeats the series of processes.

The in-vehicle authentication device 100 according to the present embodiment performs the above-described portable device authentication processing. Thus, it is possible to reduce a situation in which the battery of the portable device 10 is suddenly consumed even in the case shown in FIGS. 5A and 5B.

Figure 9A:
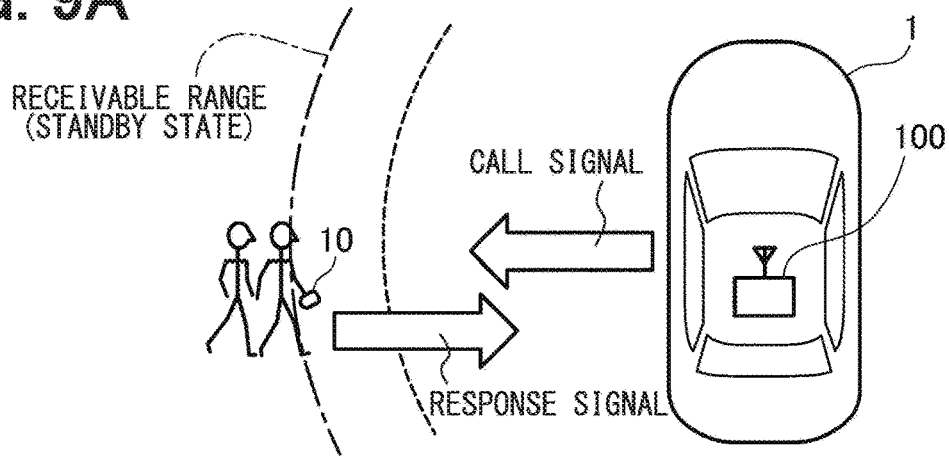
FIG. 9A is a diagram showing a situation in which the portable device is entering the receivable range of the standby state for radio wave from the in-vehicle authentication device.
Figure 9B:
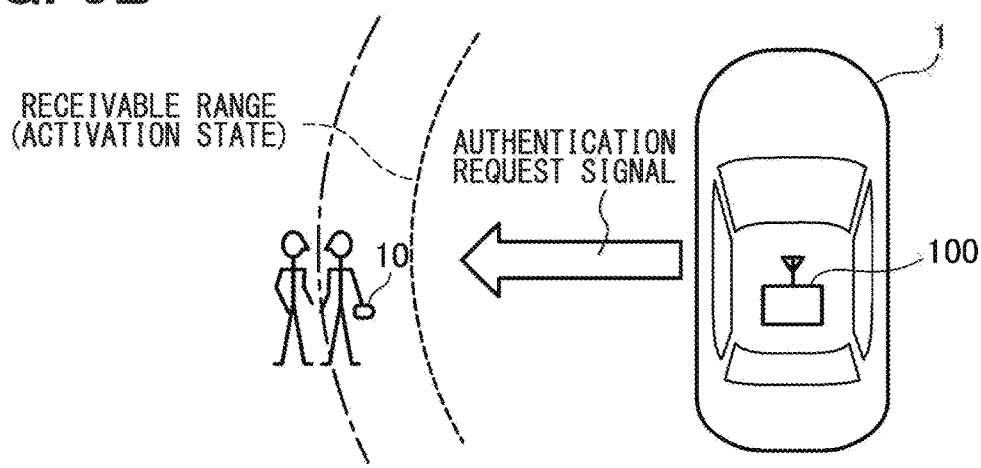
FIG. 9B is a diagram showing a situation in which the portable device exists between the receivable range in the standby state of the portable device and the receivable range in the activation state of the portable device, and the in-vehicle authentication device transmits the authentication request signal.
Figure 9C:
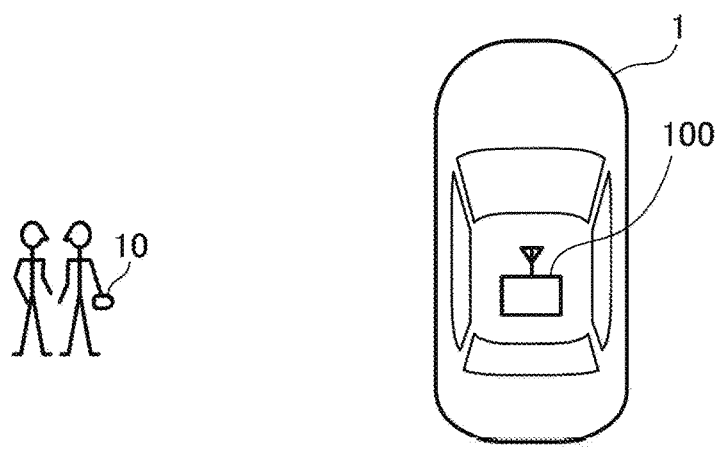
FIG. 9C is a diagram showing a situation in which the in-vehicle authentication device is in a transmission stop time for the call signal.

FIGS. 9A to 9C show the situation in which the in-vehicle authentication device 100 reduces the sudden battery consumption of the portable device 10. As shown in FIG. 9A, when the portable device 10 moves toward the vehicle 1, the portable device 10 receives the call signal from the in-vehicle authentication device 100 and returns the response signal at the state where the portable device 10 moves into the radio wave receivable range in the standby state. At this time, the portable device 10 is switched from the standby state to the activation state. When the portable device 10 is in the activation state, the reception sensitivity for the radio wave is lower than that in the standby state. As shown in FIG. 9B, when the owner of the portable device 10 stops at the position entering the radio wave receivable range of the standby state, the portable device 10 cannot receive the authentication request signal from the in-vehicle authentication device 100.

In this case, in the terminal device authentication processing, the in-vehicle authentication device 100 determines that the authentication signal cannot be received (S108: no) even though the authentication request signal has been transmitted (S107 in FIG. 6), so that the in-vehicle authentication device 100 adds "1" to the number N of no-authentication signals (S113 in FIG. 8). Thereafter, the call signal is transmitted again, and when the response signal is returned, the authentication request signal is transmitted (S100 to S107 in FIG. 6), but when the authentication signal cannot be received (S108: no), "1" is again added to the number N of no-authentication signals (S113 in FIG. 8).

When the number N of no-authentication signals reaches the threshold number (S114: yes) by repeating the above described processes, the in-vehicle authentication device 100 sets the transmission stop flag ON (S115) and sets the transmission stop time in the timer (S116). With this configuration, the in-vehicle authentication device 100 stops the transmission of the call signal until the transmission stop time elapses (S101, S102 in FIG. 6).

As a result, as shown in FIG. 9C, the portable device 10 does not transmit the response signal in response to the call signal from the in-vehicle authentication device 100 until the transmission stop time elapses. Thus, even in a case shown in FIGS. 5A and 5B, the configuration can reduce the sudden consumption of the battery of the portable device 10 in a case where the response signal is returned each time the in-vehicle authentication device 100 transmits the call signal for many times since the authentication signal is not returned.

When the transmission stop time elapses, the transmission stop flag is returned to OFF and the in-vehicle authentication device 100 again transmits the call signal. Thus, the portable device 10 transmits the reply of the response signal in response to the call signal. However, it is not necessary to returns the response signal during the transmission stop time. Thus, the consumption of the battery of the portable device 10 can be reduced.

Figure 10A:
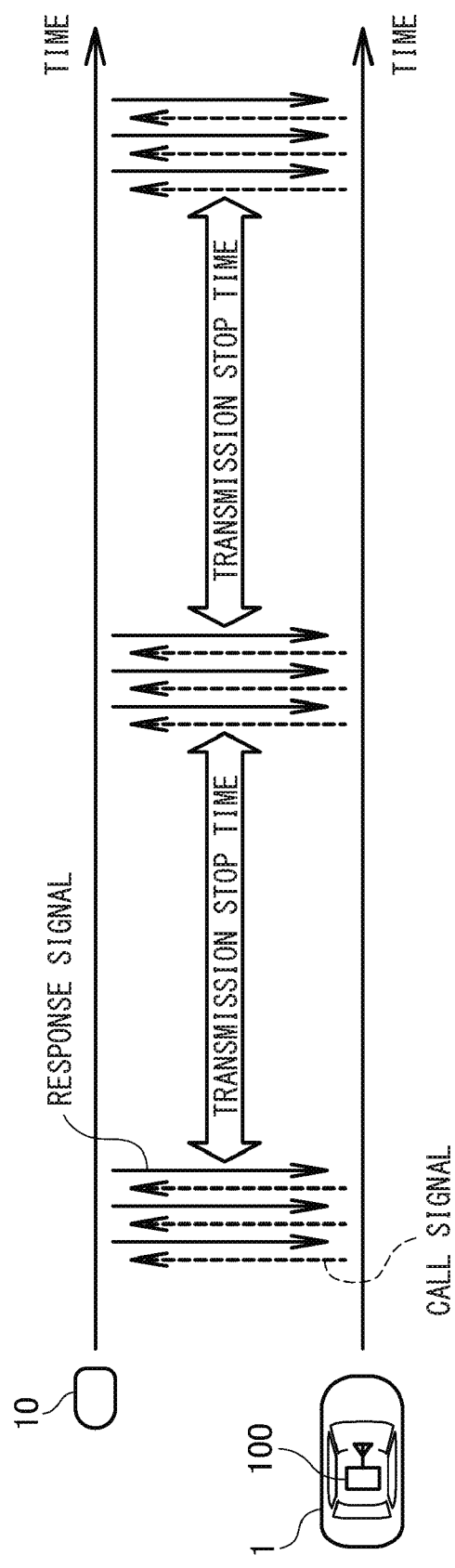
FIG. 10A is a diagram showing a situation in which the in-vehicle authentication device stops transmission of the call signal during the transmission stop time.

FIG. 10A shows the case where the in-vehicle authentication device 100 of the vehicle 1 stops the transmission of the call signal. FIG. 10B shows the case where the in-vehicle authentication device 100 of the vehicle 1 does not stop the transmission of the call signal. The broken arrow shown in the figures represents the call signal transmitted from the in-vehicle authentication device 100. The solid arrow shown in the opposite direction to the broken arrow represents the response signal transmitted by the portable device 10 in response to the call signal.

As shown in FIG. 10A, the transmission of the call signal from the in-vehicle authentication device 100 is stopped during the transmission stop time. Therefore, the frequency of returning the response signal from the portable device 10 is reduced as compared with the case where the call signal is continuously transmitted as shown in FIG. 10B. With this configuration, the in-vehicle authentication device 100 according to the present embodiment can reduce a situation where the battery of the portable device 10 is suddenly consumed even when the situation shown in FIGS. 5A and 5B occurs.

A flowchart or a process of the flowchart described in the present disclosure includes multiple parts (or steps), and each part is expressed, for example, as S100. Furthermore, each part may be divided into multiple sub-parts, while the multiple parts may be combined into one part. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

Although the present disclosure has been described in accordance with the examples, it is understood that the disclosure is not limited to such examples or structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. An in-vehicle authentication device comprising:
   a wireless communication unit configured to perform wireless communication with a portable device in a vicinity of a vehicle;
   a call signal transmission unit configured to periodically transmit a call signal that requests a reply of a response signal to the portable device via the wireless communication unit;
   an authentication request signal transmission unit configured to transmit an authentication request signal that requests a reply of an authentication signal to the portable device via the wireless communication unit when the authentication request signal transmission unit determines that the portable device exists in the vicinity of the vehicle by receiving the response signal via the wireless communication unit;

an authentication execution unit configured to authenticate the portable device that transmits the authentication signal based on the authentication signal when the authentication signal is received via the wireless communication unit;

a no-authentication signal state detection unit configured to detect a no-authentication signal state in which the authentication signal is not received from the portable device in response to the authentication request signal transmitted based on the determination that the portable device exists in the vicinity of the vehicle; and a transmission stop unit configured to set a transmission stop flag in response to the no-authentication signal state being detected while the portable device is determined to exist in the vicinity of the vehicle;

wherein, in response to the transmission stop flag being set, the call signal transmission unit is configured to (i) determine whether a predetermined stop time has elapsed since the transmission stop flag was set, (ii) stop periodically transmitting the call signal in response to determining that the predetermined stop time has not elapsed since the transmission stop flag was set, and (iii) clear the transmission stop flag and restart periodically transmitting the call signal in response to determining that the predetermined stop time has elapsed since the transmission stop flag was set.

2. The in-vehicle authentication device according to claim 1, wherein
the transmission stop unit stops the transmission of the call signal when the no-authentication signal state detection unit consecutively detects the no-authentication signal state for a predetermined number of times.

3. The in-vehicle authentication device according to claim 1, wherein the call signal transmission unit transmits the call signal again when the no-authentication signal state detection unit detects the no-authentication signal state.

4. A portable device authentication method comprising:
performing wireless communication with a portable device in a vicinity of a vehicle;
periodically transmitting a call signal that requests a reply of a response signal to the portable device;
determining whether the response signal is received;
determining that the portable device exists in the vicinity of the vehicle when the response signal is received;
transmitting an authentication request signal that requests a reply of an authentication signal to the portable device based on the determination that the portable device exists in the vicinity of the vehicle;
authenticating the portable device that transmits the authentication signal based on the authentication signal when the authentication signal is received;
detecting a no-authentication signal state in which the authentication signal is not received from the portable device in response to the authentication request signal transmitted based on the determination that the portable device exists in the vicinity of the vehicle;
setting a transmission stop flag in response to the no-authentication signal state being detected while the portable device is determined to exist in the vicinity of the vehicle; and
in response to the transmission stop flag being set, (i) determining whether a predetermined stop time has elapsed since the transmission stop flag was set, (ii) stopping the periodic transmission of the call sign in response to determining that the predetermined stop time has not elapsed since the transmission stop flag was set, and (iii) clearing the transmission stop flag and restarting the periodic transmission of the call signal in response to determining that the predetermined stop time has elapsed since the transmission stop flag was set.

5. An in-vehicle authentication device comprising a memory and a processor configured to:
perform wireless communication with a portable device in a vicinity of a vehicle;
periodically transmit a call signal that requests a reply of a response signal to the portable device;
transmit an authentication request signal that requests a reply of an authentication signal to the portable device when the processor determines that the portable device exists in the vicinity of the vehicle by receiving the response signal;
authenticate the portable device that transmits the authentication signal based on the authentication signal when the authentication signal is received;
detect a no-authentication signal state in which the authentication signal is not received from the portable device in response to the authentication request signal transmitted based on the determination that the portable device exists in the vicinity of the vehicle;
set a transmission stop flag in response to the no-authentication signal state being detected while the portable device is determined to exist in the vicinity of the vehicle; and
in response to the transmission stop flag being set, (i) determine whether a predetermined stop time has elapsed since the transmission stop flag was set, (ii) stop the periodic transmission of the call sign in response to determining that the predetermined stop time has not elapsed since the transmission stop flag was set, and (iii) clear the transmission stop flag and restarting the periodic transmission of the call signal in response to determining that the predetermined stop time has elapsed since the transmission stop flag was set.

* * * * *